May 29, 1951     R. F. HOLLIS     2,554,988
APPARATUS FOR LAMINATING MATERIALS
Filed Dec. 23, 1946
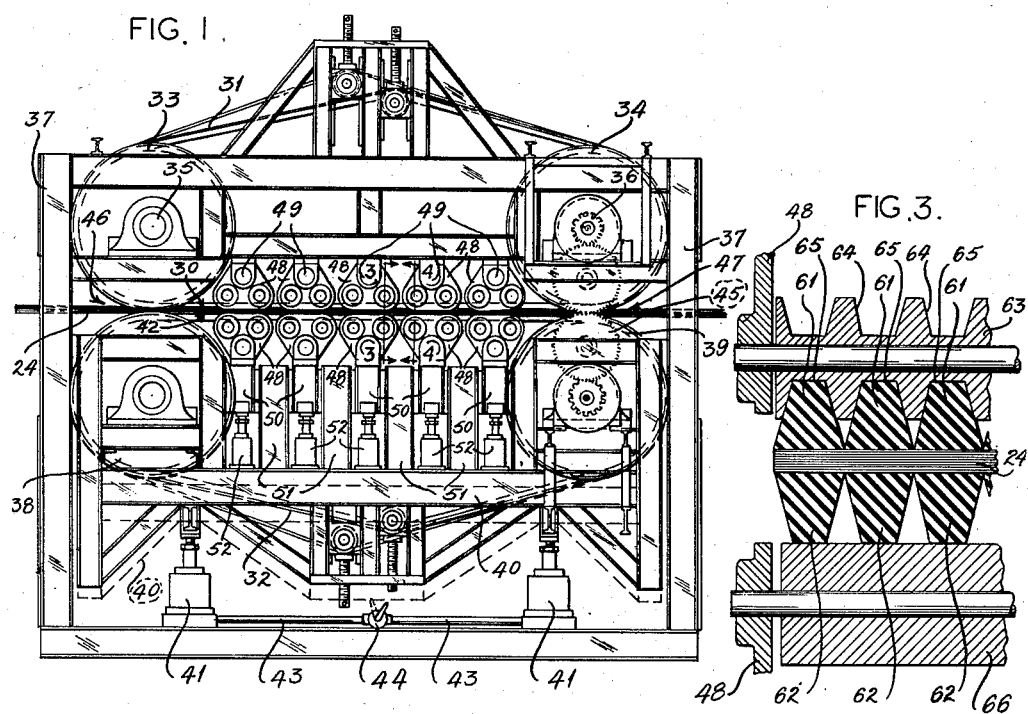
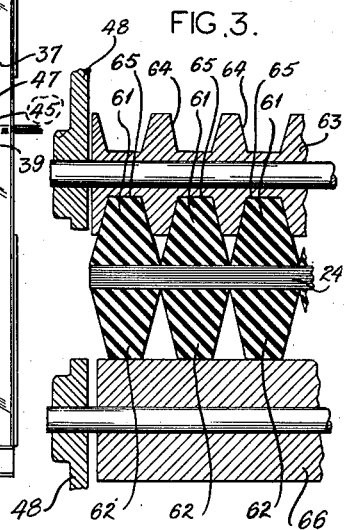
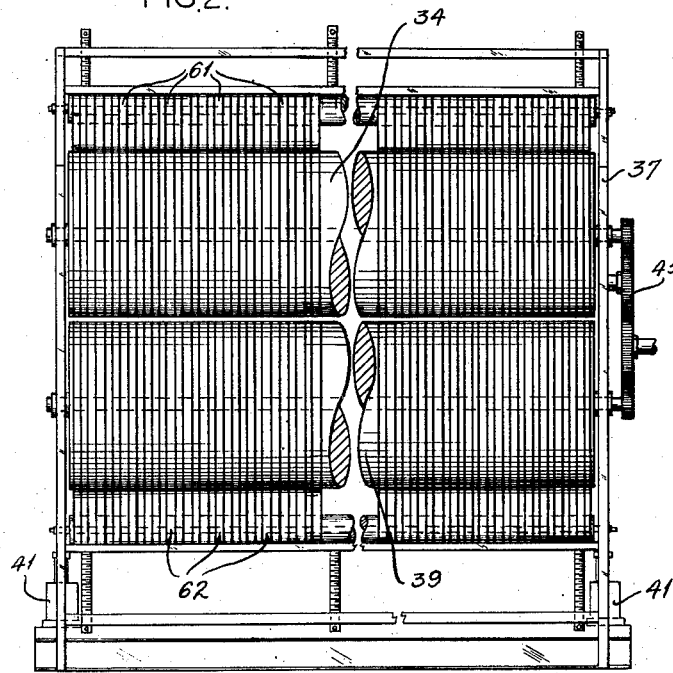
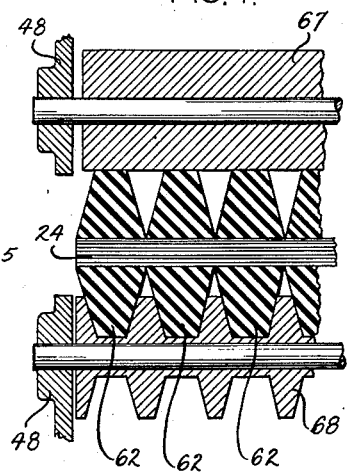
INVENTOR:
ROBERT F. HOLLIS
BY *Brauningen and Sutherland*
ATTORNEYS Patented May 29, 1951

2,554,988

UNITED STATES PATENT OFFICE 2,554,988

APPARATUS FOR LAMINATING MATERIALS

Robert F. Hollis, Alton, Ill., assignor to Alton Box Board Company, Alton, Ill., a corporation of Delaware Application December 23, 1946, Serial No. 718,034

4 Claims. (Cl. 154—1)

This invention relates generally to the lamination of sheet-like materials and particularly to a continuous press adapted for use in the manufacture of such laminated materials.

In the manufacture of laminated materials, as, for example, from strips or sheets of paper, it has heretofore been the practice to suitably impregnate the sheets and treat them with adhesive before subjecting them to pressure in order to integrate the several lamina into one compound sheet, strip, or board. The pressure operation, as heretofore employed, has considerably retarded the process because it has been necessary to maintain the composite article under static pressure for a period sufficient to permit the adhesive to set.

The object of the present invention, generally stated, is to expedite the process of laminating materials.

Another object of the invention is to provide a continuous press suitable for use in the process of laminating materials.

Other objects will become apparent to those skilled in the art when the following description is read in connection with the accompanying drawings, in which:

Figure 1 is a view in side elevation of the press utilized;

Figure 2 is a right end view of the press shown in Figure 1;

Figure 3 is a sectional view taken along line 3—3 of Figure 1 on enlarged scale; and Figure 4 is a sectional view taken along the line 4—4 of Figure 1 on enlarged scale.

In accordance with the present invention, material to be laminated is, after suitable pretreatment, fed into a continuous press which involves a pair of endless bands having adjacent reaches spaced from each other but sufficiently to admit the material to be laminated therebetween. Such endless bands are constructed, arranged, and driven at the same lineal speed and in the same direction so that, in the reaches which engage the material being subjected to pressure, relative movement between the bands is substantially nil. An important aspect of the press is the construction of the bands from a plurality of narrow belts, preferably V-belts, which are arranged in edgewise adjacence and mounted so that, when subjected to pressure, the respective belts will be distorted to produce a substantially continuous pressing surface.

Referring now to the drawings, the press is shown in a form adapted to receive and operate upon a moving sheet 24 without interrupting either the continuity of the sheet or the continuous movement thereof. The sheet 24 is illustrated as composed of laminae of paper or the like which have been preliminarily unified in any suitable way. The press consists essentially of a pair of endless bands 31 and 32. The former is mounted upon sheaves 33 and 34 and arranged so that the lower elongated reach 30 thereof is substantially aligned with the direction in which the preliminarily unified sheet 24 approaches. The sheaves 33 and 34 are mounted for rotation about fixed axes, the bearings 35 and 36, respectively, therefore being mounted upon a fixed support 37.

The lower endless band 32 is mounted upon sheaves 38 and 39 in like manner, but the bearings for the sheaves 38 and 39 are supported upon a movable carriage 40 suitably guided by support 37 for movement up and down relative to the reach 30 of band 31.

At each of the four corners of carriage 40, a pneumatic jack 41 is provided, so that, when air pressure is applied to energize the jacks 41, the carriage 40 and all the parts mounted thereon, including the band 32, are maintained in the position shown in full lines in Figure 1 where the reach 30 of band 31 is proximate to, but slightly spaced from, the upper reach 42 of band 32. When, however, the air pressure within jacks 41 is released, the carriage 40 with its adjunct parts drops to the position shown in dotted lines in Figure 1, in which latter position the reach 42 of band 32 is substantially spaced from reach 30 of band 31. In order to accomplish such quick release of the carriage 40, as in the event that the hand of an attendant became caught between the bands, any suitable pressure-release mechanism for deenergizing the jacks 41 may be provided. In the embodiment shown in the drawings, an air conduit 43 extends from all four jacks 41 to a release valve 44, the handle of which may be thrown to the dotted line position in order to release the pressure within the jacks 41.

Any suitable driving mechanism, such as a gear 45, driven by an appropriate source of motive power, may be utilized for driving the sheaves 34 and 39 at the same velocity and in the same direction, so as to accomplish a parallel movement of reaches 30 and 42 at the desired rate but without relative movement therebetween in the lineal direction. For example, if the situation be such that it is desired to maintain the preliminarily unified sheet 24 under pressure between the reaches 30 and 42 for a period of six seconds and, if there is a distance of ten feet between the entrynip 46 and the exit-nip 47, the sheaves 34 and 39 may be driven at such velocity as to accomplish movement of the reaches 30 and 42 at the rate of one hundred feet per minute.

In order to confine the orbit of the reach 30 of band 31 and assure the application of pressure thereby to the material in engagement therewith, a series of guides is arranged on the inside of reach 30. In the embodiment illustrated, the guides are in the form of paired rollers journaled at each end in an equalizing bar 48. The latter is pivoted at 49 to a part of the supporting frame 37. Similarly, orbit-defining guides are provided for the reach 42 of band 32. In this instance, the guide rollers are likewise journaled at each end in an equalizing bar 48, which latter is pivoted at 49 to an adjustable cross-head 50. The cross-head 50 is guided on ways 51 fixed upon carriage 40, so that the cross-head 50 may move up and down relative to the carriage 40. Each of the cross-heads 50 (one at each end of each pair of guide rollers) is actuated by a pneumatic jack 52. The jacks 52 at the opposite ends of each pair of guide rollers are adjustable relative to each other and relative to the other jacks in the organization, so as to accomplish the desired pressure gradient as the material being laminated progresses through the press, or to accommodate irregularities or idiosyncrasies in the material passing therethrough. It will be understood that each of the jacks 52 is provided with a separately controllable connection, not shown, to a source of compressed air.

In the embodiment shown, both of the bands 31 and 32 are composed of a series of edgewise aligned rubber belts 61 and 62. The belts 61 and 62 are preferably of truncated triangular cross section of the character usually referred to in the belt-drive art as V-belts. Consequently, the peripheral surfaces of the sheaves 33, 34, 38, and 39 are grooved to receive such V-belts as 61 and 62. As many parallel grooves are formed in the surface of each of the sheaves as there will be belts composing the bands. The respective grooves in the surfaces of the sheaves are arranged close together, the optimum disposition being such that some of the substance of the belt extends radially outward beyond the mouths of the groove and sufficiently close axially to the adjacent belt that (at least when subjected to radial pressure) the individual belts become edgewise contiguous and produce a continuous working surface. If any clearance be left between the edges of adjacent belts, it should not be so great that, when the belts are subjected to pressure by the guide rollers along the reaches 30 and 42, they will fail to distort sufficiently to become substantially contiguous edgewise. As hereinafter described in connection with the grooving of the guide rollers, the V-grooves of the respective sheaves are preferably of complemental cross section to the cross section of that portion of the V-belts which enter the grooves. In contrast to the V-belt arrangements generally employed in power transmissions, it is preferred that the narrow truncated surface of the V-belts in the press of the present invention seat flat against the companion surface of the groove, and that the converging sides of the belts likewise be in engagement with the sides of the groove.

Referring now to Figures 3 and 4 for a more detailed explanation of the form of the guide rollers previously referred to, it will be observed that the roller 63 above reach 30 is grooved in conformity with the cross section of the V-belt 61. The rollers 63 are thus provided with a series of parallel grooves 64, said grooves having side walls which converge radially inward at the same angle as the side walls of the belt 61. As shown clearly in Figure 3, the grooves 64 are arranged sufficiently close together that the portion of the belt 61 which extends outwardly beyond the grooves is contiguous edgewise with the neighboring belt 61. It is important that the truncated surface 65, constituting the inner periphery of the belt, seat flat against the bottom of the groove 64.

The guide roller 66 arranged below reach 42 in vertical alignment with roller 63 is, however, ungrooved, being a plain, cylindrical roller, seating against the truncated portion, i. e., the inner periphery of the belts.

The rollers 63 and 66 may be as long as convenient. For example, it is advantageous to form the grooved rollers 63 with four or five grooves and arrange a plurality of such rollers in end-to-end relation on a single shaft. It will be understood, however, that an individual roller may be provided for each belt or a single roller may be provided across the entire width of the press.

In Figure 4, a set of rollers adjacent the rollers 63 and 66 is shown and it will be observed that the arrangement is just the reverse of that above described in connection with Figure 3. In this instance, the upper roller 67 is a plain, cylindrical roller, while the lower roller 68 is grooved to receive the V-belt 62 in precisely the same manner as described above with reference to roller 63.

Preferably, the pairs of rollers on either side of the reaches 30 and 42 alternate between the grooved and plain forms. While all of the rollers engage the interior periphery of the belts, so as to press the latter toward each other, it is not necessary that all be grooved to maintain the orbit of the belt lineally. If desired, however, all of the guide rollers may be of the grooved form 63 and 68 and, while most of the rollers may, if desired, be of the plain form 66 and 67, it is preferred that at least some of them be grooved to assure that the travel of the belts will be confined to the desired lineal orbit, in which, as pointed out above, the several belts are in edgewise substantial contiguity.

In the operation of the press, the preliminarily unified strip of board 24 is first subjected to substantial pressure at the nip 46. As that increment of the board travels in the direction of the arrow, it may be subjected to greater or less pressure as it enters between the first set of guide rollers, it being recalled in this connection that the jacks 52 are adjustable to vary the pressure between the guide rollers, but it is desirable in any event that the travel of the unified strip of board be not deviated from rectilinear as it travels progressively through the pressure zone. It is preferred that, as shown, the successive guide rollers be spaced relatively close together in order that local deviations of the respective reaches 30 and 42 be minimized. With V-belts of the character shown and the guide rollers arranged substantially close together, such local deviations of the belts as may occur do not affect the character of the board produced.

From the foregoing description, those skilled in the art should readily understand the construction and operation of the continuous press and the process in which it is utilized, and should realize that the invention accomplishes its objects and provides for continuous pressure lamination of materials without interfering with the continuous feed of raw sheets through the process.

While one complete embodiment of the invention has been described in detail, it is obvious that many variations and modifications will suggest themselves to those skilled in the art without departing from the spirit of the invention, and it is, therefore, to be distinctly understood that the embodiment herein disclosed is by way of illustration only and that the invention is not limited to the details thereof.

Having thus described the invention, what is claimed and desired to be secured by Letters Patent is:

1. A press for laminating materials comprising, a pair of endless bands so mounted that one reach of each band is parallel with and proximate to but spaced from a reach of the other band sufficiently to admit the material to be laminated therebetween, means for driving said bands at the same lineal velocity and direction in said proximate reaches, and orbit-defining means engaging the backs of the respective bands along said reaches, each of said bands consisting of a plurality of edgewise adjacent V-belts, and said orbit defining means being positioned so as to compress said V-belts into edgewise contiguity.

2. A press for laminating materials comprising, a pair of endless bands so mounted that one reach of each band is parallel with and proximate to but spaced from a reach of the other band sufficiently to admit the material to be laminated therebetween, means for driving said bands at the same lineal velocity and direction in said proximate reaches, and orbit-defining means engaging the backs of the respective bands along said reaches, each of said bands consisting of a plurality of edgewise adjacent V-belts and said orbit-defining means including a plurality of V-grooved rollers arranged to receive but partially the backs of the respective V-belts, and said orbit defining means being positioned so as to compress said V-belts into edgewise contiguity.

3. A press for laminating materials comprising, a support, an endless band mounted on said support, a series of guides arranged for engagement with the inside of the lower reach of said band for defining the orbit thereof, a carriage mounted on said support for movement relative thereto toward and away from the lower reach of said band, an endless band mounted on said carriage for disposition of the upper reach thereof in close adjacence to the lower reach of the first mentioned band, fluid-energized means for maintaining said carriage in position whereat said band reaches are in close adjacence, said means being releasable to drop the carriage into position whereat the upper reach of the second mentioned band is substantially spaced from the lower reach of the upper band, and a series of guides mounted on said carriage for engagement with the inside of the upper reach of the second mentioned band, the last mentioned guides being adjustable relative to the carriage and each other, said bands each consisting of a series of V-belts in edgewise contiguity, and at least some of said guides being V-grooved to but partially receive the V-belts.

4. A press comprising a rotatable member having its exterior surface provided with a succession of closely spaced parallel grooves whose side walls converge inwardly, and a belt seated in each of said grooves with a portion thereof extending radially beyond the mouths of the grooves, said belts having a cross section complementary to said grooves, said radially extending portions of said belts being of width such that the edges of adjacent belts are contiguous under radial pressures.

ROBERT F. HOLLIS.

REFERENCES CITED

The following references are of record in the file of this patent:

UNITED STATES PATENTS

| Number | Name | Date |
| --- | --- | --- |
| 408,578 | Butz | Aug. 6, 1889 |
| 1,999,151 | Finley | Apr. 23, 1935 |
| 2,046,047 | Watkins | June 30, 1936 |
| 2,152,732 | Dreymann | Apr. 4, 1939 |
| 2,158,675 | Davies | May 16, 1939 |
| 2,303,087 | Neller | Nov. 24, 1942 |
| 2,371,926 | Schmitt | Mar. 20, 1945 |
| 2,423,138 | Crosby | July 1, 1947 |